United States Patent [19]

Asai

[11] Patent Number: 5,685,652
[45] Date of Patent: Nov. 11, 1997

[54] METHOD OF PREPARING THRESHOLD MATRIX AND METHOD OF AND APPARATUS FOR GENERATING HALFTONE IMAGE

[75] Inventor: Hiroshi Asai, Kyoto, Japan

[73] Assignee: Dainippon Screen Mfg. Co., Ltd., Kyoto, Japan

[21] Appl. No.: 574,004

[22] Filed: Dec. 18, 1995

[30] Foreign Application Priority Data

Dec. 27, 1994 [JP] Japan .................... 6-338723

[51] Int. Cl.[6] .................................. B41J 2/315
[52] U.S. Cl. ........................ 400/120.07; 347/183
[58] Field of Search ..................... 347/183, 184; 400/120.07

[56] References Cited

U.S. PATENT DOCUMENTS

| | | | |
|---|---|---|---|
| 4,890,121 | 12/1989 | Hirahara et al. | 347/184 |
| 5,099,259 | 3/1992 | Hirahara et al. | 347/183 |
| 5,494,361 | 2/1996 | Sonoda | 400/120.07 |

FOREIGN PATENT DOCUMENTS 6-181525  6/1994  Japan .

*Primary Examiner*—John S. Hilten
*Attorney, Agent, or Firm*—Lowe, Price, LeBlanc & Becker

[57] ABSTRACT

The present invention is made to effectively prevents the occurrence of undesirable dot patterns in the process of FM screening. Threshold values in an M1×M2 threshold matrix are determined using a plurality of fundamental tiles of 2×2 dots in size. The method of the invention arranges the plurality of fundamental tiles in the M1×M2 threshold matrix region, while not allowing the fundamental tiles to have preset forbidden arrangements. This gives a 50% dot pattern including 50% black dots and 50% white dots. The values '0' and '1' are assigned as the upper-most paired bits of digital data representing a threshold value to the positions of two black dots in each fundamental tile, and the values '2' and '3' are assigned as the upper-most paired bits to the positions of two white dots. The values of the other paired bits included in the digital data representing a threshold value are determined by successively dividing the M1×M2 threshold matrix region into four equal parts and allocating different values of '0' through '3' to the four divisional matrix regions.

20 Claims, 14 Drawing Sheets

Fig. 2(A) BLACK DOT
Fig. 2(B) WHITE DOT
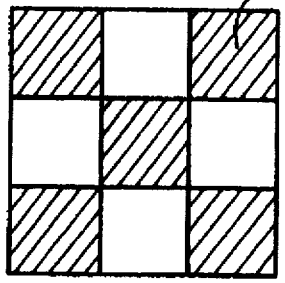
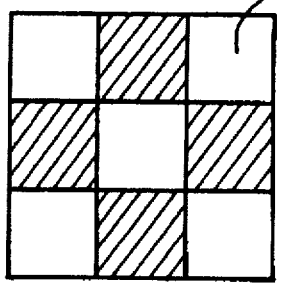
Fig. 2(C)
Fig. 2(D)
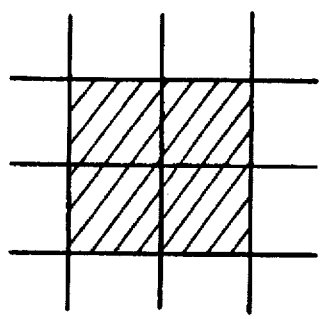
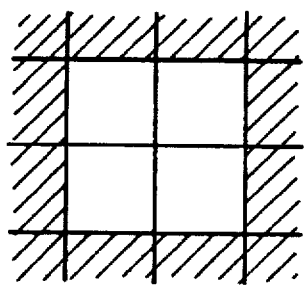
Fig. 2(E)
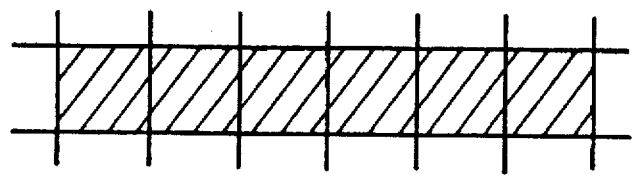
Fig. 2(F)
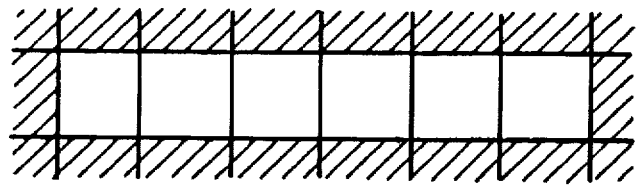

Fig. 5(A) Fig. 5(B)  Fig. 5(E) Fig. 5(F)
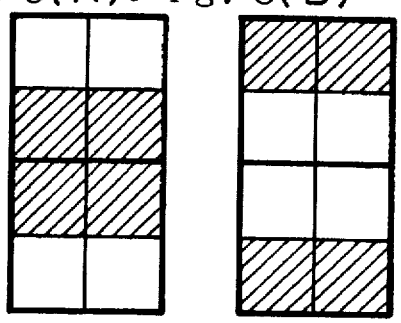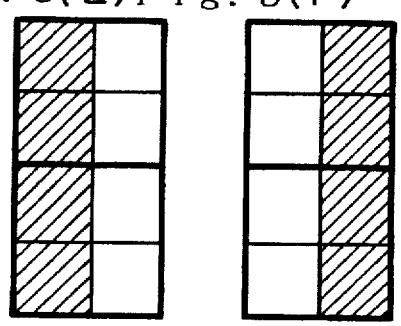
Fig. 5(C)  Fig. 5(G)
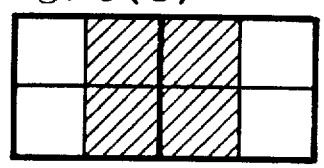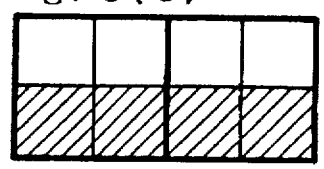
Fig. 5(D)  Fig. 5(H)
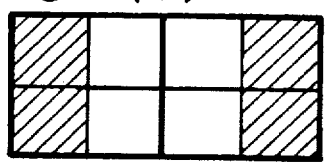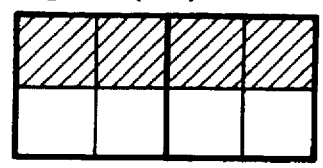
Fig. 6(A)  Fig. 6(B)
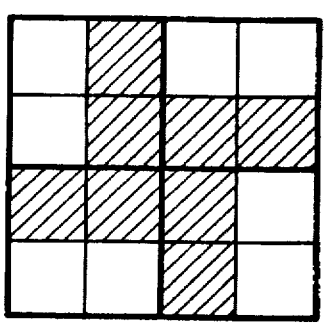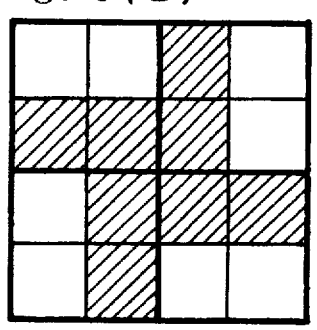
Fig. 6(C)  Fig. 6(D)
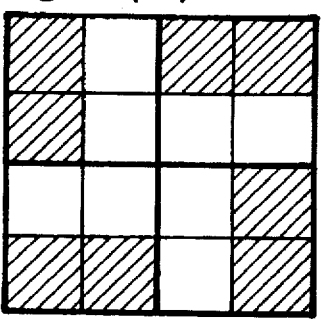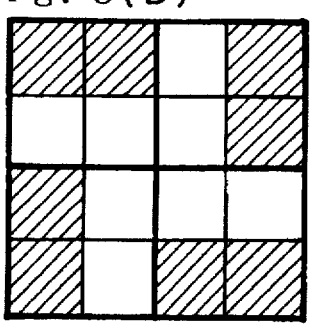

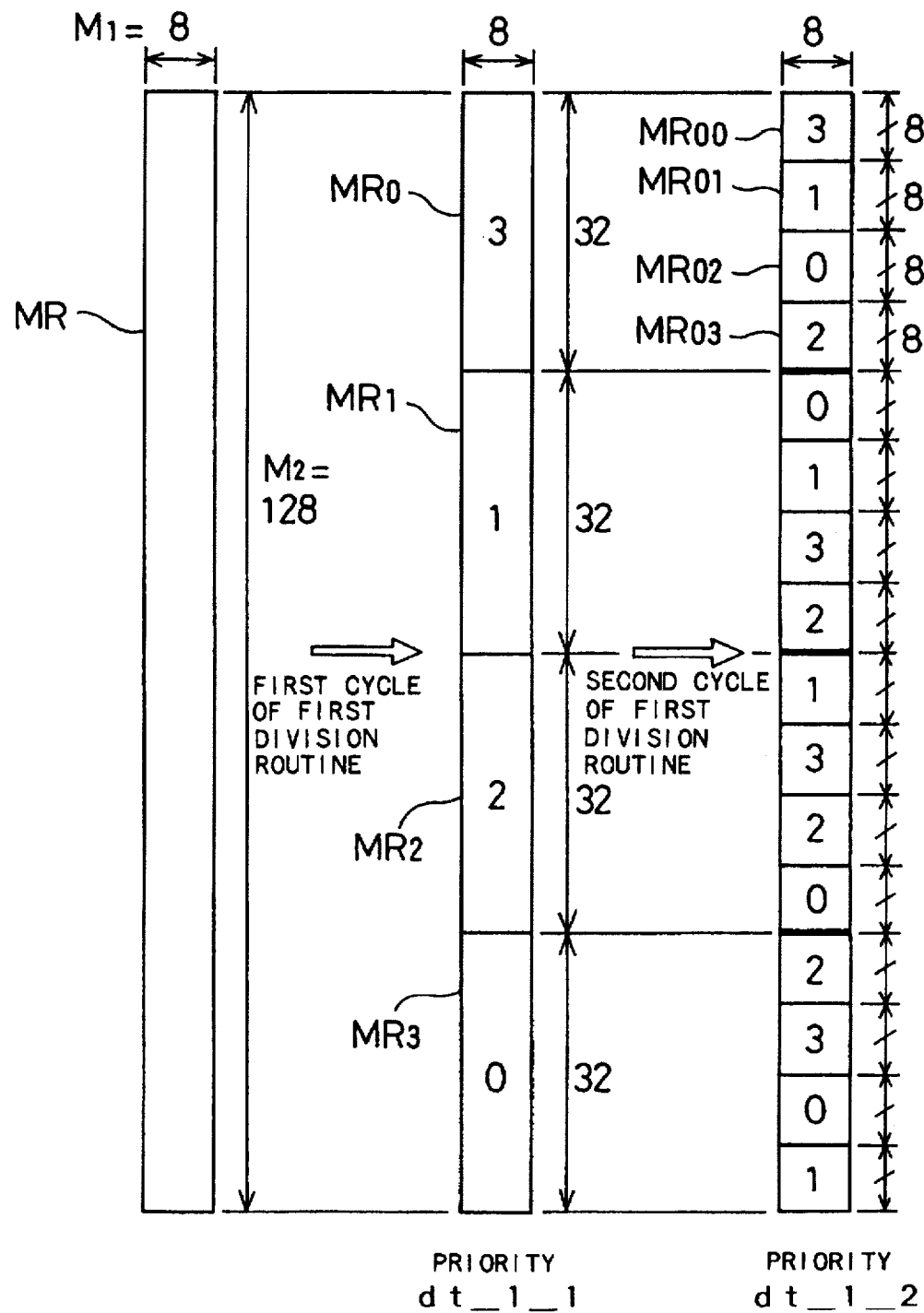

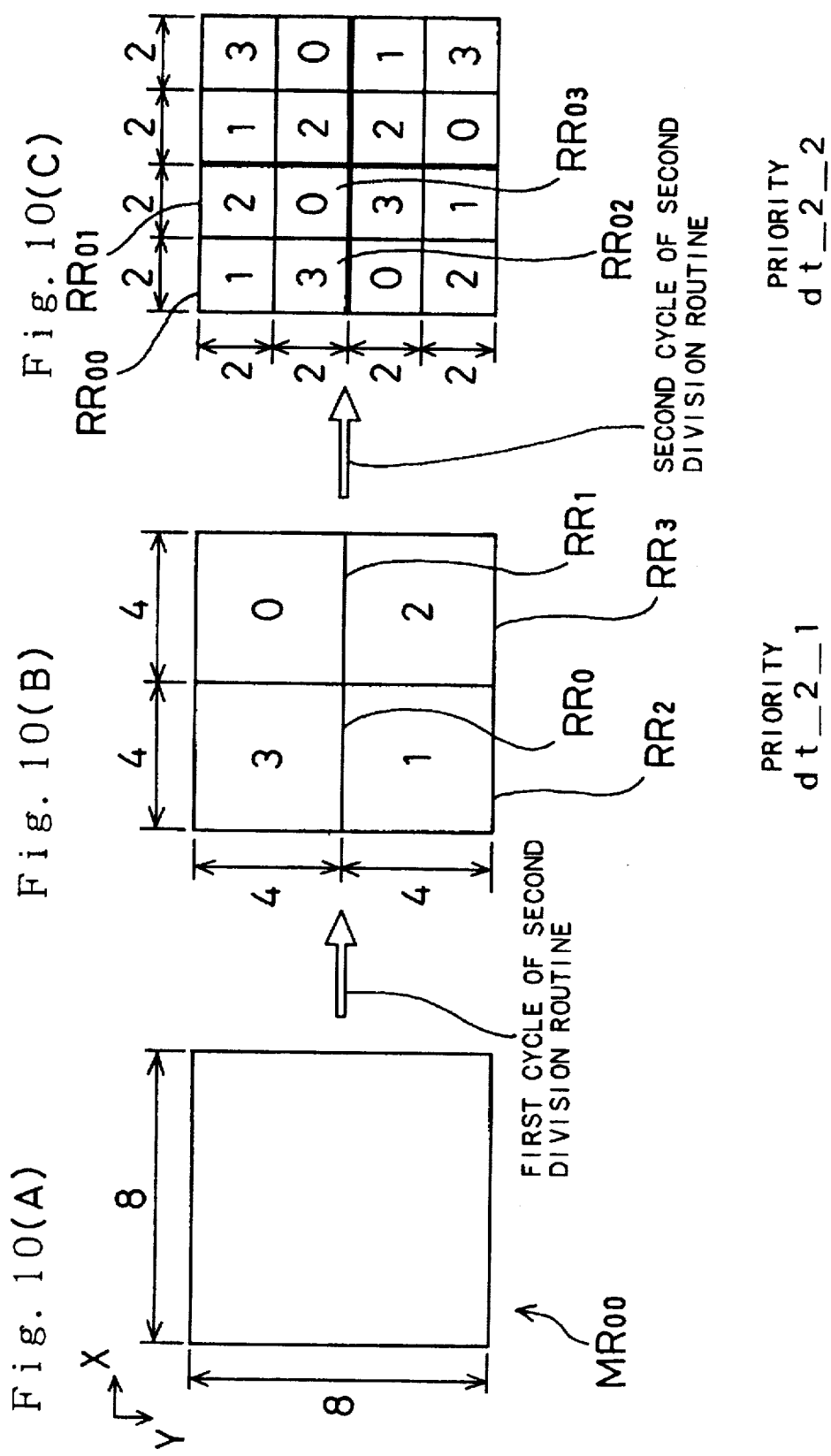

(STEP S2)

PRIORITY
dt_3

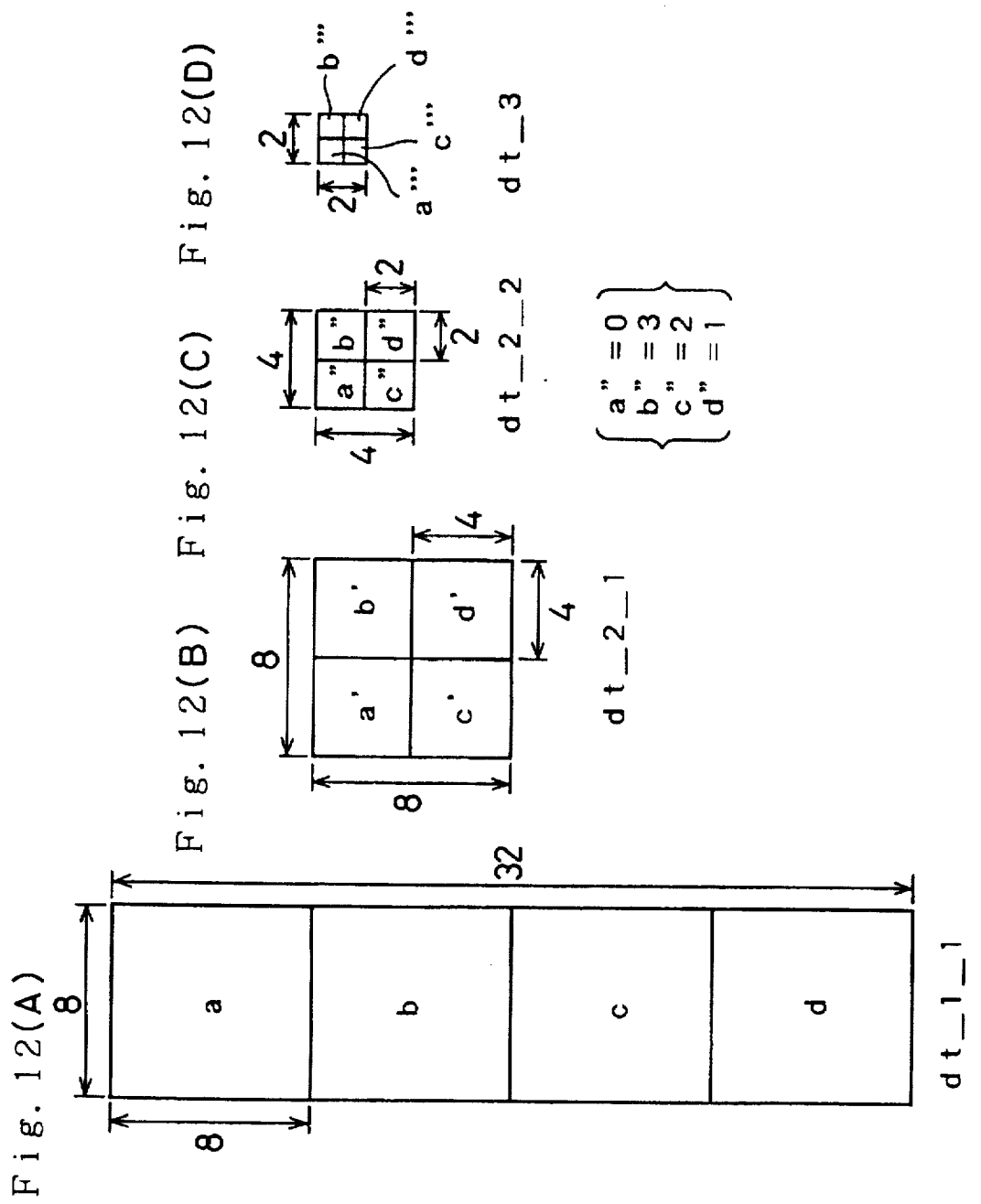

Fig. 13

| | 1 | 2 | 3 | 4 | 5 | 6 | 7 | 8 |
|---|---|---|---|---|---|---|---|---|
| 1 | 1003 | 2003 | 1303 | 2303 | 1023 | 3023 | 2323 | 3323 |
| 2 | 0003 | 3003 | 0303 | 3303 | 0023 | 2023 | 1323 | 0323 |
| 3 | 3203 | 1203 | 0103 | 1103 | 3223 | 1223 | 3123 | 0123 |
| 4 | 2203 | 0203 | 2103 | 3103 | 2223 | 0223 | 2123 | 1123 |
| 5 | 0033 | 2033 | 0333 | 1333 | 1013 | 3013 | 2313 | 3313 |
| 6 | 1033 | 3033 | 2333 | 3333 | 0013 | 2013 | 1313 | 0313 |
| 7 | 3233 | 2233 | 0133 | 2133 | 3213 | 2213 | 0113 | 2113 |
| 8 | 1233 | 0233 | 1133 | 3133 | 1213 | 0213 | 1113 | 3113 |
| 9 | 1011 | 3011 | 3311 | 2311 | 2021 | 1021 | 2321 | 3321 |
| 10 | 0011 | 2011 | 1311 | 0311 | 3021 | 0021 | 1321 | 0321 |
| 11 | 3211 | 1211 | 2111 | 0111 | 3221 | 2221 | 1121 | 2121 |
| 12 | 2211 | 0211 | 3111 | 1111 | 0221 | 1221 | 0121 | 3121 |
| 13 | 0031 | 3031 | 1331 | 2331 | 0001 | 3001 | 0301 | 1301 |
| 14 | 1031 | 2031 | 0331 | 3331 | 1001 | 2001 | 2301 | 3301 |
| 15 | 2231 | 1231 | 2131 | 0131 | 3201 | 1201 | 0101 | 1101 |
| 16 | 3231 | 0231 | 3131 | 1131 | 2201 | 0201 | 2101 | 3101 |
| 17 | 0002 | 1002 | 2302 | 3302 | 1022 | 0022 | 0322 | 2322 |
| 18 | 2002 | 3002 | 1302 | 0302 | 3022 | 2022 | 1322 | 3322 |
| 19 | 2202 | 1202 | 2102 | 0102 | 0222 | 1222 | 2122 | 3122 |
| 20 | 3202 | 0202 | 3102 | 1102 | 2222 | 3222 | 1122 | 0122 |
| 21 | 2032 | 3032 | 1332 | 0332 | 0012 | 3012 | 1312 | 3312 |
| 22 | 0032 | 1032 | 3332 | 2332 | 1012 | 2012 | 0312 | 2312 |
| 23 | 0232 | 2232 | 0132 | 2132 | 1212 | 0212 | 3112 | 0112 |
| 24 | 1232 | 3232 | 1132 | 3132 | 2212 | 3212 | 2112 | 1112 |
| 25 | 1020 | 0020 | 2320 | 0320 | 2010 | 1010 | 1310 | 0310 |
| 26 | 2020 | 3020 | 3320 | 1320 | 3010 | 0010 | 2310 | 3310 |
| 27 | 3220 | 1220 | 1120 | 0120 | 3210 | 2210 | 3110 | 1110 |
| 28 | 2220 | 0220 | 3120 | 2120 | 1210 | 0210 | 2110 | 0110 |
| 29 | 1000 | 3000 | 0300 | 1300 | 0030 | 2030 | 3330 | 2330 |
| 30 | 0000 | 2000 | 3300 | 2300 | 1030 | 3030 | 0330 | 1330 |
| 31 | 2200 | 1200 | 2100 | 0100 | 2230 | 0230 | 2130 | 3130 |
| 32 | 3200 | 0200 | 3100 | 1100 | 3230 | 1230 | 0130 | 1130 |

3 2 3 0 (IN QUATERNARY NOTATION)
11 10 11 00 (IN BINARY NOTATION)

dt_3   dt_2_2   dt_2_1   dt_1_1
          dt_2              dt_1

OFFSET ADDRESS OF COMPONENT Y

OFFSET ADDRESS OF COMPONENT M

OFFSET ADDRESS OF COMPONENT C

OFFSET ADDRESS OF COMPONENT K

METHOD OF PREPARING THRESHOLD MATRIX AND METHOD OF AND APPARATUS FOR GENERATING HALFTONE IMAGE

BACKGROUND OF THE INVENTION

1. Field of the Invention

The present invention relates to a method of preparing a threshold matrix, which is to be used in converting multi-tone image data to halftone image data. The invention also pertains to a method of generating halftone images with the threshold matrix and an apparatus for the same.

2. Description of the Related Art

In the field of printing, a continuous-tone image is converted to a halftone image to reproduce the continuous-tone image. A halftone images is constituted by a large number of small dots, or halftone dots, whose size is changed according to the image density; the higher the density, the greater the dot size. When a printed matter with an array of dots is observed with the naked eye, the resulting visible image has a density similar to that of the original continuous-tone image.

In order to make a color print, a plurality of printing plates for primary colors are prepared. The plurality of printing plates reproduce halftone images, which are made to have different screen angles from each other to prevent moire in the color print. For example, four printing plates for Y (yellow), M (magenta), C (cyan), and K (black) have screen angles of 0, 15, 75, and 45 degrees, respectively.

The conventional technique of reproducing a continuous-tone image with halftone dots may not accurately reproduce sharp edges in the original image (fine drawing lines in pictures or edges of characters). A method called 'FM screening' (Frequency Modulation screening) has recently been applied to cope with this problem. In FM screening, the frequency of appearance of small dots is varied according to the image density while the size of each dot is fixed. Since the small dots are more dispersed in the FM screening than the conventional halftone dots, an original image can be reproduced with a higher resolution. The FM screening does not have periodicity in appearance of small dots, and it does not cause moire and rosette patterns in multicolor printing accordingly.

In the FM screening, small dots are arranged to have a substantially random distribution. In halftone images of about 50 dot percent (area rate of small dots), however, checkerboard patterns and local specific patterns may be observed due to an aggregation of small dots and/or blank areas.

Since the checkerboard patterns have high spatial frequencies, they are preferable for the reproducibility of image details. However, the checkerboard patterns increase the total circumferential length of dots, or total length of border lines between black dots and bland areas, thereby undesirably enhancing a dot gain. The dot gain is defined to be a dot percent change due to the process of generating printing plates from halftone films or due to the process of printing. The dot gain usually increases as a ratio of the circumferential length of dots to the dot percent does.

Printing machines are adjusted to print a image with a high reproducibility according to the dot gain characteristics of conventional halftone dots. It is thus preferable that halftone images prepared by the FM screening have dot gain characteristics similar to those of conventional halftone images. In this context, the checkerboard patterns are not desirable in the image areas of about 50 dot percent.

The local patterns formed by an aggregation of black dots and/or blank areas reduce the spatial frequency of the halftone image, thereby worsening the reproducibility of image details. These undesirable dot patterns, the checkerboard patterns and the local aggregation patterns, are formed according to a threshold matrix used in the FM screening.

SUMMARY OF THE INVENTION

An object of the invention is thus to prevent the occurrence of undesirable dot patterns in the FM screening.

The present invention is directed to a method of producing a threshold matrix used in a halftone process of multi-tone image data. The method comprises the steps of:

(a) providing a plurality of fundamental tiles each having a size of 2×2 dots in which two black dots and two white dots are arranged in parallel;

(b) arranging the plurality of fundamental tiles in a threshold matrix region while preventing the fundamental tiles to form a predetermined forbidden arrangement, thereby determining an array of black dots and white dots in a 50%-halftone image in the threshold matrix region, the 50%-halftone image having an area rate of 50% for both of black dots and white dots; and (c) determining threshold values in the threshold matrix region based on the arrangement of the plurality of fundamental tiles in the threshold matrix region, thereby producing the threshold matrix.

In the description herein, the term 'white dot' denotes a bland area or a dropout area.

Since the predetermined forbidden arrangement of the fundamental tiles are prevented to generate a threshold matrix, the threshold matrix effectively prevent the occurrence of undesirable local dot patterns in a halftone image up to 50 dot percent.

In the preferred embodiment, the predetermined forbidden arrangement comprises a first-type forbidden arrangement in which at least either of black dots and white dots are arrayed in a 2×2 square shape. This prevents the occurrence of undesired checkerboard patterns, thereby attaining appropriate dot gain characteristics.

Further, the predetermined forbidden arrangement comprises a second-type forbidden arrangement in which at least either of black dots and white dots are arrayed in a 4×1 linear shape. This prevents the occurrence of undesired linear patterns, thereby improving the reproducibility of image details.

Preferably, the step (c) comprises the step of: assigning values of 0 and 1 to an upper-most pair of bits of 2N-bit digital data representing threshold values at the positions of two black dots in each fundamental tile in the threshold matrix region, where N is an integer of at least 2, and assigning values of 2 and 3 to the upper-most pair of bits for threshold values at the positions of two white dots in each fundamental tile. Accordingly, the positions of white dots and black dots which are set in the step (a) can be accurately reproduced in a halftone image of 50 dot percent.

The threshold matrix region has a width of M1 dots in a first scanning direction and a width of M2 dots in a second scanning direction, where M1 is an integer of a power of 2 and M2 is an integer obtained by multiplying M1 by a power of 4; and the step (c) further comprises the steps of:

(1) dividing the threshold matrix region along the second scanning direction into four equal parts to produce four pieces of first divisional regions, and assigning different 2-bit values representing first priorities of 0 through 3 to the first divisional regions, respectively;

(2) repeating the step (1) until a width of each of the first divisional regions in the second scanning direction becomes equal to the width M1 of the threshold matrix region, thereby producing a plurality of M1×M1 divisional regions;

(3) dividing each of the plurality of M1×M1 divisional regions into two equal parts both in the first scanning direction and the second scanning direction to produce four pieces of second divisional regions, and assigning different 2-bit values representing second priorities of 0 through 3 to the second divisional regions, respectively;

(4) repeating the step (3) until each of the second divisional regions has a width of 2 dots; and (5) allocating the first and second priorities to (N−1) pairs of lower bits in the 2N-bit digital data representing threshold values, thereby determining threshold values in the threshold matrix region.

Accordingly, N pairs of bits in the 2N-bit digital data, which represents a threshold value of each dot, can be easily determined.

The present invention is also directed to a method of generating a halftone image by comparing multi-tone image data with a threshold matrix. The method comprises the steps of:

(a) providing a first memory for storing a threshold matrix, the threshold matrix being prepared by (i) providing a plurality of fundamental tiles each having a size of 2×2 dots in which two black dots and two white dots are arranged in parallel;

(ii) arranging the plurality of fundamental tiles in a threshold matrix region while preventing the fundamental tiles to form a predetermined forbidden arrangement, thereby determining an array of black dots and white dots in a 50%-halftone image in the threshold matrix region, the 50%-halftone image having an area rate of 50% for both of black dots and white dots; and (iii) determining threshold values in the threshold matrix region based on the arrangement of the plurality of fundamental tiles in the threshold matrix region, thereby producing the threshold matrix;

(b) comparing multi-tone image data with a threshold value read out of the first memory, thereby converting the multi-tone image data to a recording signal representing a halftone image; and (c) producing the halftone image in response to the recording signal.

The present invention is further directed to an apparatus for generating a halftone image by comparing multi-tone image data with a threshold matrix. The apparatus comprises:

a memory for storing a threshold matrix, the threshold matrix being prepared by (i) providing a plurality of fundamental tiles each having a size of 2×2 dots in which two black dots and two white dots are arranged in parallel;

(ii) arranging the plurality of fundamental tiles in a threshold matrix region while preventing the fundamental tiles to form a predetermined forbidden arrangement, thereby determining an array of black dots and white dots in a 50%-halftone image in the threshold matrix region, the 50%-halftone image having an area rate of 50% for both of black dots and white dots; and (iii) determining threshold values in the threshold matrix region based on the arrangement of the plurality of fundamental tiles in the threshold matrix region, thereby producing the threshold matrix;

means for reading out a threshold value from the memory; and a comparator for comparing multi-tone image data with the threshold value read out of the memory, thereby converting the multi-tone image data to a recording signal representing a halftone image; and recording means for producing the halftone image in response to the recording signal.

These and other objects, features, aspects, and advantages of the present invention will become more apparent from the following detailed description of the preferred embodiments with the accompanying drawings.

BRIEF DESCRIPTION OF THE DRAWINGS

FIGS. 2(A), 2(B), 2(C), 2(D), 2(E) and 2(F) show undesirable local dot patterns;

FIGS. 5(A), 5(B), 5(C), 5(D), 5(E), 5(F), 5(G) and 5(H) show examples of forbidden arrangements;

FIGS. 6(A), 6(B), 6(C) and 6(D) show other examples of forbidden arrangements;

FIGS. 9(A), 9(B) and 9(C) show details of the process executed at steps S3 through S5 in the flowchart of FIG. 1;

FIGS. 10(A), 10(B) and 10(C) show details of the process executed at steps S6 through S8 in the flowchart of FIG. 1;

FIGS. 12(A), 12(B), 12(C) and 12(D) show a method of area division applied in the process of preparing an 8×32 threshold matrix;

FIG. 13 shows an example of M1×M2 threshold matrix prepared according to the process of the embodiment;

DESCRIPTION OF THE PREFERRED EMBODIMENT

A. Preparation of Threshold Matrix

Figure 1:
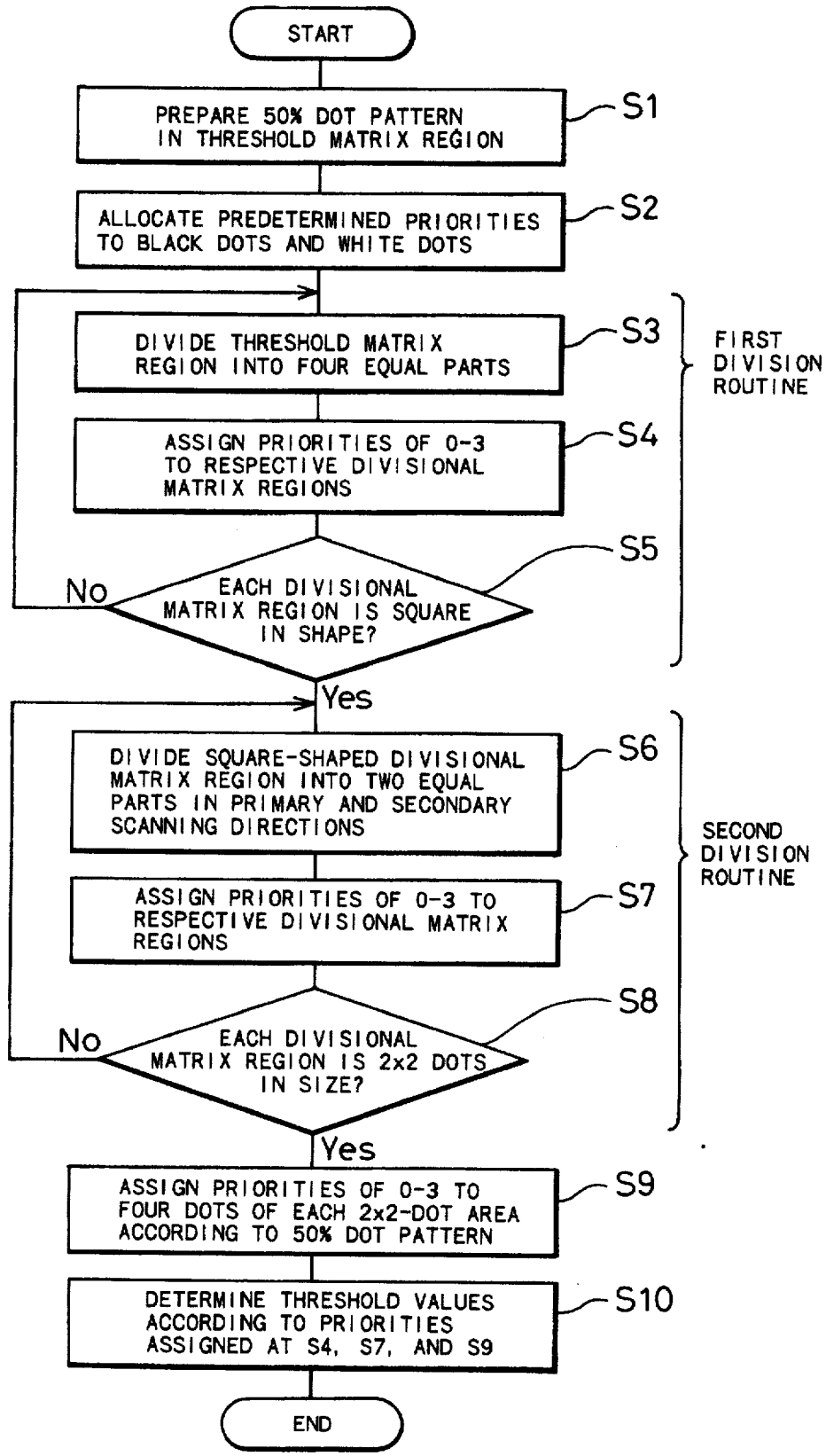
FIG. 1 is a flowchart showing a process routine embodying the present invention.

FIG. 1 is a flowchart showing a process routine embodying the present invention. This process routine involves preparing a threshold matrix having a size of M1×M2 dots. M1 is an integer of an n-th power of 2, such as 2, 4, 8, etc. M2 is an integer obtained by multiplying M1 by an n-th power of 4, such as 4×M1, 16×M1, 64×M1, etc.

At step S1, a 50% dot pattern is created in an M1×M2 threshold matrix region. The 50% dot pattern is defined to have an area rate of 50% for both of black dots and white dots. In this embodiment, a 50% dot pattern is generated according to a method described below, which effectively prevents the occurrence of undesirable local dot patterns as shown in FIGS. 2(A)–2(F). FIGS. 2(A) and 2(B) are checkerboard patterns; FIGS. 2(C) and 2(D) are patterns where four black dots or four white dots are arranged to have a 2×2 square shape; and FIGS. 2(E) and 2(F) are patterns where black dots or white dots are arranged in a linear shape. The undesirable local dot patterns include those obtained by rotating the patterns of FIGS. 2(E) and 2(F) by 90 degrees.

Figure 3:
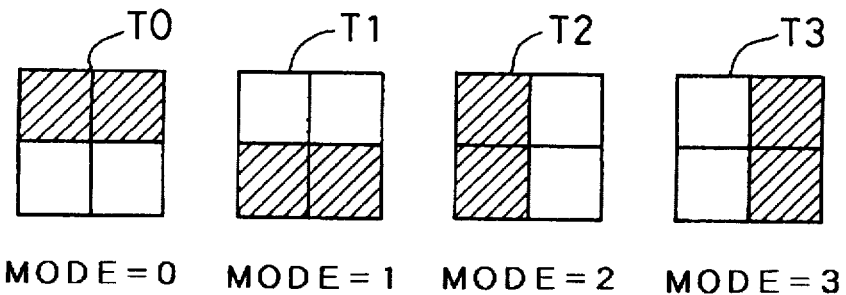
FIG. 3 shows four fundamental tiles used in the embodiment.

In order to prevent the occurrence of the undesirable local dot patterns as shown in FIGS. 2(A)–2(F), the process of this embodiment generates a 50% dot pattern in a threshold matrix region using four fundamental tiles T0 through T3 shown in FIG. 3. Each fundamental tile has a size of 2×2 dots, where two black dots and two white dots are arranged in parallel. The four fundamental tiles T0 through T3 are assigned with mode data MODE of '0' through '3', respectively.

Figure 4:
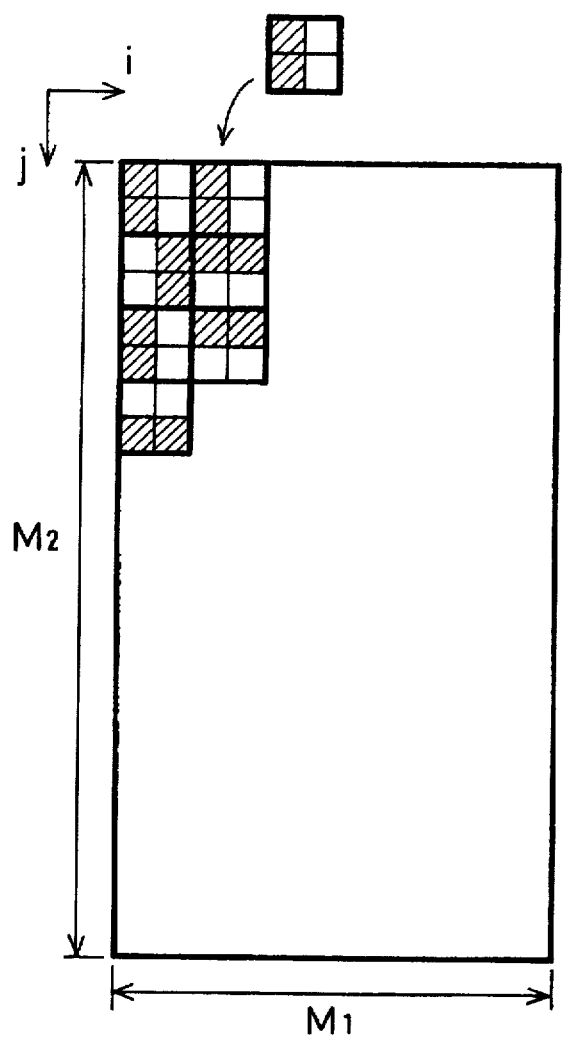
FIG. 4 shows a process of preparing a 50% dot pattern by successively allocating the four fundamental tiles in an M1×M2 threshold matrix region.

FIG. 4 shows a concrete step of preparing a 50% dot pattern by successively allocating the four fundamental tiles T0 through T3 in an M1×M2 threshold matrix region. The 50% dot pattern is generated by randomly determining the values of mode data MODE[i][j] at respective tile positions in the M1×M2 threshold matrix region, where the mode data MODE[i][j] denotes a two-dimensional array defined by two subscripts 'i' and 'j'. In this process, however, the arrangements shown in FIGS. 5(A)–5(H) and 6(A)–6(D) are forbidden to prevent the undesirable local dot patterns shown in FIGS. 2(A)–2(F).

FIGS. 5(A) through 5(D) show type I forbidden arrangements, where black dots or white dots are arrayed in a 2×2 square shape. FIGS. 5(E) through 5(H) show type II forbidden arrangements, where black dots or white dots are arrayed in a 4×1 linear shape. FIGS. 6(A) through 6(D) show another type I forbidden arrangements, where black dots or white dots are arrayed in a 2×2 square shape. When any one of the type I and the type II forbidden arrangements shown in FIGS. 5(A)–5(H) and 6(A)–6(D) is to appear in the process of assigning the four fundamental tiles in the M1×M2 threshold matrix region as shown in FIG. 4, the last assigned fundamental tile is replaced by another fundamental tile. This effectively prevents the occurrence of undesirable local dot patterns as shown in FIGS. 2(A)–2(F).

Figure 7:
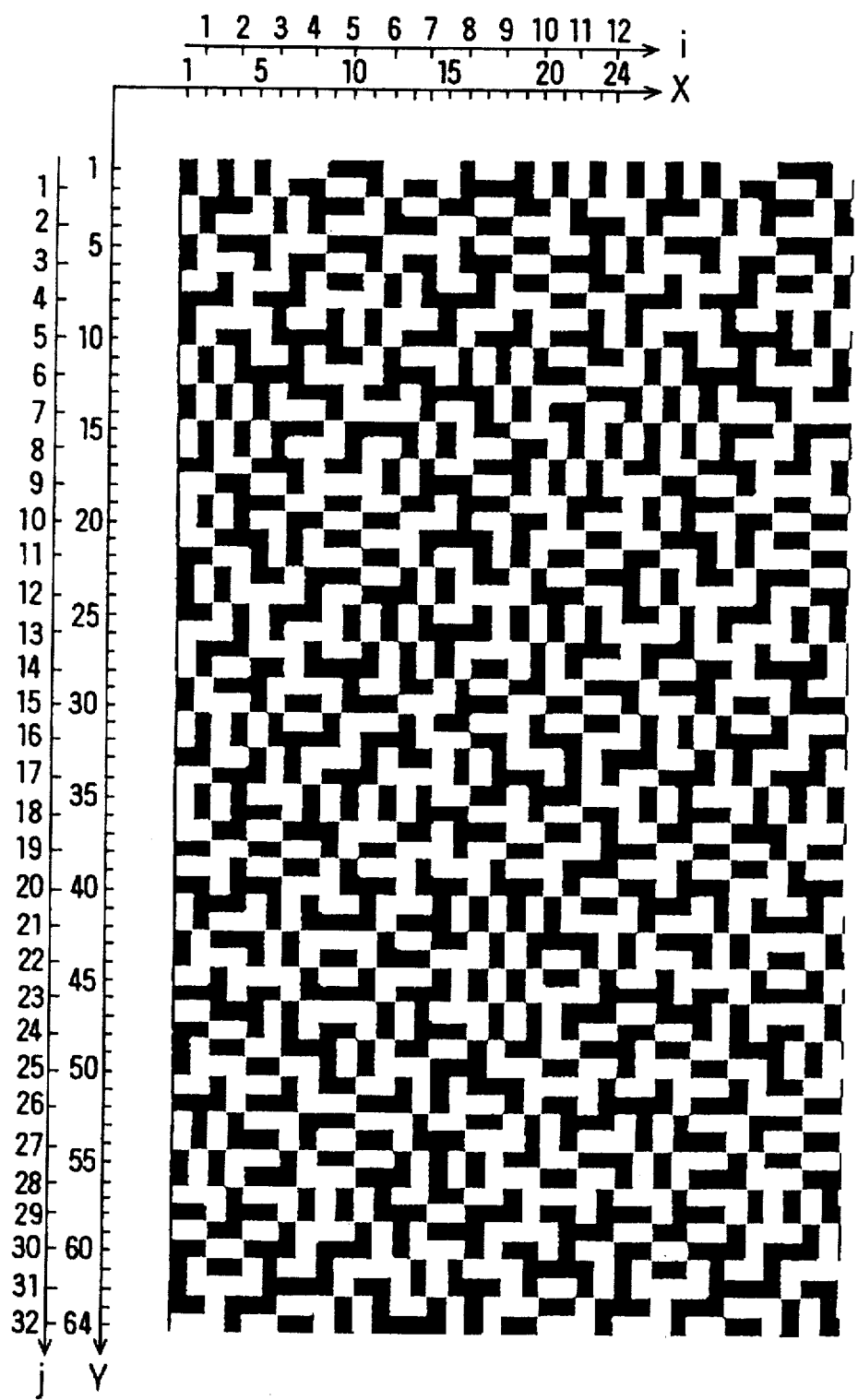
FIG. 7 is a plan view illustrating an example of 50% dot pattern.

FIG. 7 is a plan view illustrating an example of 50% dot pattern thus generated. The drawing shows that the 50% dot pattern consists of the four fundamental tiles T0 through T3 shown in FIG. 3 and that none of the undesirable local dot patterns shown in FIGS. 2(A)–2(F) appear.

Figure 8:
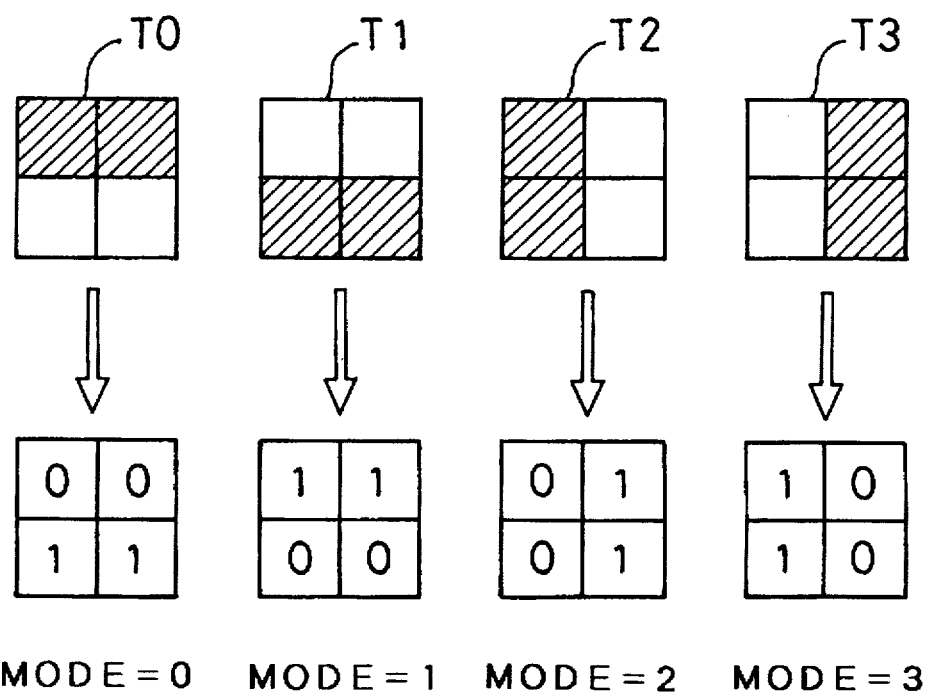
FIG. 8 shows priorities allocated to black dots and white dots.

After the preparation of a 50% dot pattern in the M1×M2 threshold matrix region, step S2 in the flowchart of FIG. 1 is executed, where predetermined priorities are allocated to the black dots and the white dots in the 50% dot pattern. In this embodiment, a priority '0' is assigned to the black dots and '1' to the white dots as shown in FIG. 8. The term 'priority' in the description herein involves the meaning that positions of the black dots are blackened preferentially over (that is, prior to) those of white dots. Any other predetermined values allowing distinction between black dots from white dots may alternatively be assigned at step S2.

In a first division routine of steps S3 through S5 in the flowchart of FIG. 1, a width M2 in a primary scanning direction of the M1×M2 threshold matrix region is divided into four equal parts (step S3), and four different priority values of '0' through '3' are allocated to the four divisional matrix regions thus obtained (step S4). The process of steps S3 and S4 is repeated until each divisional matrix region forms a square shape (step S5).

FIGS. 9(A)–9(C) show details of the process executed at steps S3 through S5 in the flowchart of FIG. 1. In the example of FIGS. 9(A)–9(C), M1=8 and M2=128. At step S3, the width M2 in the primary scanning direction of an M1×M2 threshold matrix region MR shown in FIG. 9(A) is divided into four equal parts to give four divisional matrix regions $MR_0$ through $MR_3$ as shown in FIG. 9(B). At step S4, four different values '0' through '3' are randomly allocated to the four divisional matrix regions $MR_0$ through $MR_3$ as priority data dt__1__1.

Alternatively, the priority values, which are assigned to the respective four positions in advance, may be allocated to the four divisional matrix regions. For example, priority values of '3', '1', '2', and '0' may be set to the top-most position through the bottom-most position in this order, and assigned as the priority data dt__1__1 to the four divisional matrix regions.

At step S5, it is determined whether each of the divisional matrix regions $MR_0$ through $MR_3$ obtained at step S3 has a square shape. Since the width M2 in the primary scanning direction of the M1×M2 threshold matrix region is an integer obtained by multiplying a width M1 in a secondary scanning direction by an n-th power of 4, the repeated execution of steps S3 and S4 eventually makes each divisional matrix region square in shape. When each divisional matrix region does not have a square shape at step S5, the program returns to step S3 to repeat the first division routine.

FIG. 9(C) shows divisional matrix regions $MR_{00}$ through $MR_{03}$, etc., which are obtained by the second cycle of step S3. In the second cycle of steps S3 through S5, four different priority data dt__1__2 of '0' through '3' of are randomly allocated, for example, to the four divisional matrix regions $MR_{00}$ through $MR_{03}$, which are produced by dividing the original divisional matrix region $MR_0$. The same procedure is carried out for the other divisional matrix regions $MR_1$ through $MR_3$ shown in FIG. 9(B).

A first comprehensive priority dt__1 assigned to each divisional matrix region of square shape shown in FIG. 9(C) is defined by the priority dt__1__1 given by the first cycle of the first division routine and the priority dt__1__2 given by the second cycle of the routine according to Equation 1:

$$dt\_1 = dt\_1\_1 + 4 \times dt\_1\_2 \quad (1)$$

The first division routine of steps S3 through S5 is repeated many times for the large width M2 in the primary scanning direction of the M1×M2 threshold matrix region. In general, the first comprehensive priority dt__1 allocated to each of the final divisional matrix regions of square shape obtained by $N_1$ cycles of the first division routine is given by Equation 2:

$$dt\_1 = \sum_{i=1}^{N_1} 4^{(i-1)} \times dt\_1\_i \quad (2)$$

where dt__1__i denotes a priority assigned at the i-th cycle of the first division routine.

Since each divisional matrix region has a square shape in the state of FIG. 9(C), the program proceeds from step S5 to step S6 in FIG. 1.

Steps S6 through S8 constitute a second division routine, which further divides each square-shaped divisional matrix region into smaller square-shaped divisional matrix regions.

FIGS. 10(A)–10(C) show details of the process executed at steps S6 through S8 in the flowchart of FIG. 1. The example of FIGS. 10(A)–10(C) shows the process of further dividing the 8×8 square-shaped divisional matrix region $MR_{00}$ at the top-most position in FIG. 9(C). At step S6, the square-shaped divisional matrix region $MR_{00}$ shown in FIG. 10(A) is divided into two equal parts both in a primary scanning direction Y and a secondary scanning direction X, so as to give four square-shaped divisional matrix regions $RR_0$ through $RR_3$ as shown in FIG. 10(B). At step S7, four different priority data dt_2_1 of '0' through '3' are randomly assigned to the respective divisional matrix regions $RR_0$ through $RR_3$.

Alternatively, the priority values, which are assigned to the respective four positions in advance, may be allocated to the four divisional matrix regions. According to another possible procedure, one of eight diagonal patterns, in which the values '0' and '1' are present at diagonal positions and the values '2' and '3' also at diagonal positions, is selected at random, and the priority dt_2_1 is allocated to the four divisional matrix regions based on the selected diagonal pattern.

At step S8, it is determined whether each of the divisional matrix regions $RR_0$ through $RR_3$ obtained at step S6 has a size of 2×2 dots. Since the width M1 in the secondary scanning direction of the M1×M2 threshold matrix region is expressed as an n-th power of 2, the repeated execution of steps S6 and S7 allows each divisional matrix region to eventually have the size of 2×2 dots. When each divisional matrix region does not have the size of 2×2 dots at step S8, the program returns to step S6 to repeat the second division routine.

FIG. 10(C) shows divisional matrix regions $RR_{00}$ through $RR_{03}$, etc., which are obtained by the second cycle of step S6. In the second cycle of the second division routine, four different priority data dt_2_2 of '0' through '3' are randomly allocated, for example, to the four divisional matrix regions $RR_{00}$ through $RR_{03}$, which are generated by dividing the original divisional matrix region $RR_0$. The same procedure is also carried out for the other divisional matrix regions $RR_1$ through $RR_3$ shown in FIG. 10(B). A second comprehensive priority dt_2 assigned to each divisional matrix region of 2×2 dots shown in FIG. 10(C) is defined by the priority dt_2_1 given by the first cycle of the second division routine and the priority dt_2_2 given by the second cycle of the routine according to Equation 3:

$$dt\_2 = dt\_2\_1 + 4 \times dt\_2\_2 \quad (3)$$

The second division routine of steps S6 through S8 is repeated many times for the large width M1 in the secondary scanning direction of the M1×M2 threshold matrix region. In general, the second comprehensive priority dt_2 allocated to each of the final divisional matrix regions of 2×2 dots obtained by $N_2$ cycles of the second division routine is given by Equation 4:

$$dt\_2 = \sum_{j=1}^{N_2} 4^{(j-1)} \times dt\_2\_j \quad (4)$$

where dt_2_j denotes a priority assigned at the j-th cycle of the second division routine.

Figures 11A, 11B, 11C:
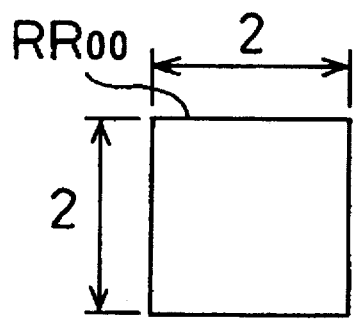
FIGS. 11(A), 11(B) and through 11(C) show details of the process executed at step S9 in the flowchart of FIG. 1.

At step S9, four different third priority data dt_3 of '0' through '3' are assigned to the four dots in each 2×2 divisional matrix region obtained by the process up to step S8. FIGS. 11(A)–11(C) show details of the process executed at step S9. At step S9, the value of either '0' or '1' is randomly allocated as the third priority dt_3 to the black dots to which the priority value '0' has been assigned at step S2 (FIG. 11(B)) and the value of either '2' or '3' is randomly allocated as the third priority dt_3 to the white dots to which the priority value '1' has been assigned at step S2.

The third priority dt_3 determines the upper-most two bits of digital data representing a threshold value as described later in detail. The process of step S9 is thus equivalent to the process of setting the upper-most two bits of digital data representing a threshold value equal to the value '0' or '1' for the black dots in the threshold matrix region shown in FIG. 7 while setting the upper-most two bits of digital data equal to the value '2' or '3' for the white dots.

At step S10, a final priority dt assigned to each dot is calculated from the first priority dt_1 (Equation 2) allocated in the first division routine, the second priority dt_2 (Equation 4) allocated in the second division routine, and the third priority dt_3 allocated at step S9 according to Equation 5:

$$dt = dt\_1 + 4^{N_1} \times dt\_2 + 4^{(N_1+N_2)} \times dt\_3 \quad (5)$$

where $N_1$ denotes the number of executed cycles of the first division routine, and $N_2$ denotes the number of executed cycles of the second division routine.

The final priority dt given by Equation 5 is digital data representing a threshold value of each dot.

FIGS. 12(A)–12(D) show an example of the region division process applied in preparing an 8×32 threshold matrix. First priorities dt_1_1[a] to dt_1_1[d] are assigned to four divisional matrix regions a to d (FIG. 12(A)) obtained by the first division routine. In this example, dt_1_1[a]=3, dt_1_1[b]=1, dt_1_1[c]=2, and dt_1_1[d]=0. Four different values '0' through '3' are randomly allocated as priorities dt_2_1[a'] to dt_2_1[d'] to four divisional matrix regions a' to d' (see FIG. 12(B)) obtained by the first cycle of the second division routine. In this embodiment, the priorities dt_2_1[a'] to dt_2_1[d'] are those selected at random among the eight diagonal patterns (in which the values '0' and '1' are at diagonal positions and the value '2' and '3' at diagonal positions). Four different values '0' through '3' are randomly allocated as priorities dt_2_2[a"] to dt_2_2[d"] to four divisional matrix regions a" to d" (FIG. 12(C)), which are obtained by the second cycle of the second division routine. In this example, the priority is set to a fixed diagonal pattern of dt_2_2[a"]=0, dt_2_2[b"]=3, dt_2_2[c"]=2, and dt_2_2[d"]=1. Third priorities dt_3[a'''], dt_3[b'''], dt_3[c'''], and dt_3[d'''] are allocated respectively to four dots a''' through d''' (FIG. 12(D)) in each 2×2 dot matrix according to the method described above.

FIG. 13 shows an example of 8×32 threshold matrix prepared by the process of FIGS. 12(A)–12(D). In the example of FIG. 13, the threshold value of each dot is expressed in quaternary notation or quaternary coding system. As given in the bottom of FIG. 13, the lower-most digit of each threshold value expressed in quaternary notation is the first priority dt_1(=dt_1_1) allocated in the process of FIG. 12(A). The second lower digit and the third lower digit of each threshold value are the second priorities dt_2_1 and dt_2_2 allocated in the process of FIGS. 12(B) and 12(C). The upper-most digit of each threshold value represents the third priority dt_3 allocated in the process of FIG. 12(D).

In binary notation or binary coding system, each digit in quaternary notation is expressed by two bits (hereinafter referred to as paired bits). The lower-most paired bits of each threshold value in binary notation represent the first priority dt_1; the second lower paired bits and the third lower paired bits of each threshold value represent the second priorities dt_2_1 and dt_2_2; and the upper-most paired bits of each threshold value represent the third priority dt_3. In general, $N_1$ pieces of the lowest paired bits represent the first priority dt__1 (Equation 2) when the first division routine of the flowchart of FIG. 1 is executed $N_1$ times. $N_2$ pieces of $(N_1+1)$-th through $(N_1+N_2)$-th lower paired bits represent the second priority dt__2 (Equation 4) when the second division routine is executed $N_2$ times. The upper-most paired bits represent the third priority dt__3.

In the example of FIG. 13, the priority dt__2__2 allocated to the four 2×2 dot areas a" through d", which are shown in FIG. 12(C), included in each 4×4 dot area is set to have a fixed diagonal pattern of dt__2__2[a"]=0, dt__2__2[b"]=3, dt__2__2[c"]=2, and dt__2__2[d"]=1. The priority dt__2__2 is assigned to the third lower paired bits as shown in the bottom of FIG. 13. As in this case, if the distribution of the third lower paired bits is set to have a fixed diagonal pattern, black dots are not adjacent to one another in a range of 0 through 6.25 dot percent, where the value 6.25 is obtained by 100/16. This attains favorable graininess of black dots in this range; that is, large aggregation of black dots is prevented. Favorable graininess of white dots is also observed in another range of 93.75 through 100 dot percent.

Threshold values in the M1×M2 threshold matrix region are determined according to the process described above. The M1×M2 threshold matrix thus obtained produces a halftone image having such a pattern as shown in FIG. 7 at 50 dot percent, which is free from the undesirable local dot patterns as shown in FIGS. 2(A)–2(F).

By randomly allocating four different values of '0' through '3' to four divisional matrix regions in at least either of the first and second division routines shown in FIG. 1, the threshold values can be randomly arranged in the threshold matrix. The random threshold matrix will reproduce image details at a high precision.

In producing a halftone image on a recording medium with a light beam, ON/OFF of the light beam for each dot is determined according to the relationship between image data ID and threshold value TD given by Inequalities (6a) and (6b):

$$\text{Image data ID>Threshold value TD: ON (black)} \quad (6a)$$

$$\text{Image data ID}\leq\text{Threshold value TD: OFF (white)} \quad (6b)$$

If the image data is 2N-bit digital data where N is an integer satisfying $2^N=(M1\times M2)^{0.5}$, the image data has M1×M2 tone levels from 0 to (M1×M2−1). In order to reproduce all of the tone levels of the image data according to Inequalities (6a) and (6b), the maximum threshold value (M1×M2−1) in each M1×M2 threshold matrix is to be replaced by any value in a range of 0 to (M1×M2−2). This adjusts the maximum threshold value to be (M1×M2−2). In an 8×32 threshold matrix, for example, the adjusted threshold values range from 0 to 254(=8×32−2) while the 8-bit image data range from 0 to 255. Therefore, the comparison between the threshold values and the 8-bit multi-tone image data will reproduce 256 tone levels. The adjusted M1×M2 threshold matrix with the replaced maximum threshold value has such a distribution that every threshold value in a range of 0 to (M1×M2−2) appears at least once while one threshold value appears twice; in other words, only one of the threshold values appears twice in the matrix while all the other threshold values appear only once.

Figure 14:
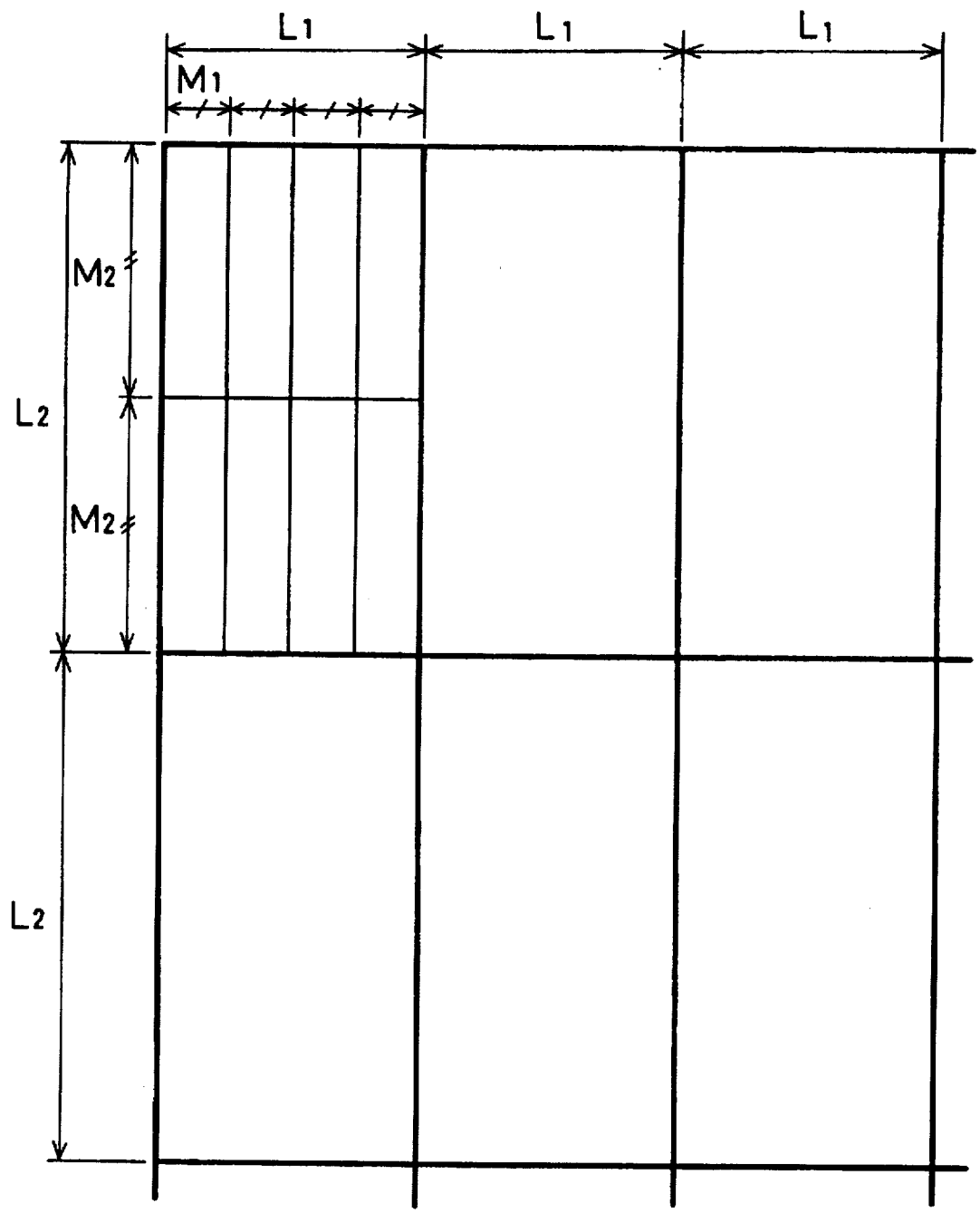
FIG. 14 shows an L1×L2 threshold matrix consisting of a plurality of M1×M2 threshold matrices.
Figure 15A:
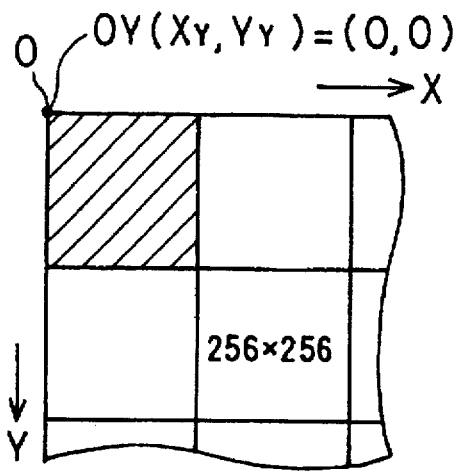
FIGS. 15(*a*), 15(*b*), 15(*c*) and 15(*d*) show a second method of executing the halftone process of color image data.
Figure 15B:
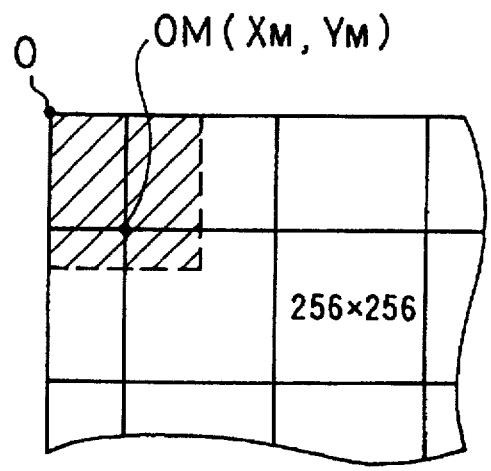
Figure 15C:
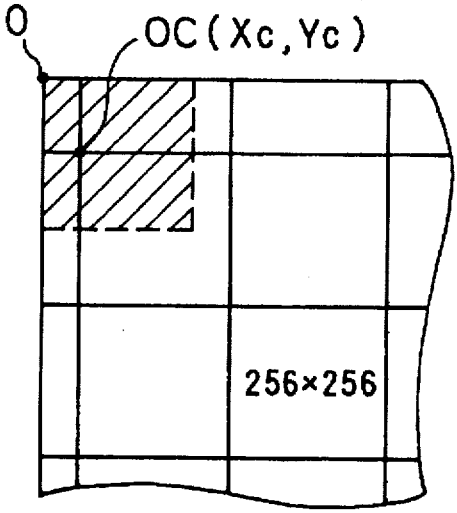
Figure 15D:
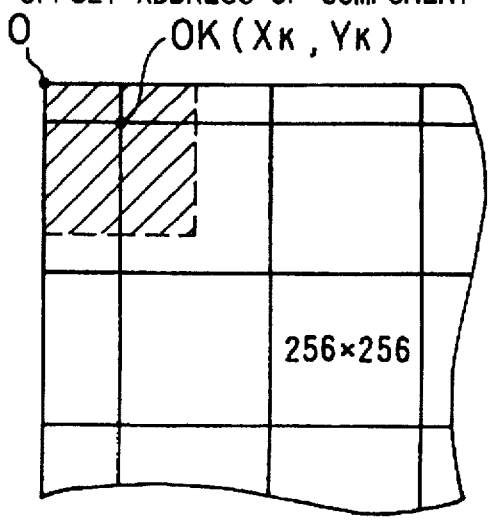

The halftone process implemented by repeatedly applying one M1×M2 threshold matrix both in the primary scanning direction and the secondary scanning direction may cause a repeated pattern in a halftone image due to intrinsic characteristics of the M1×M2 threshold matrix. In order to prevent the occurrence of such a repeated pattern, the actual procedure will utilize an L1×L2 threshold matrix, which consists of a plurality of M1×M2 threshold matrices as shown in FIG. 14. L1 and L2 respectively denote integral multiples of M1 and M2. For example, an arrangement of 8×32 threshold matrices in two columns and four rows gives a 32×64 threshold matrix. In generating the L1×L2 matrix, a plurality of M1×M2 threshold matrices are generated to have different distributions of threshold values.

It is preferable to form an L1×L2 threshold matrix which will reproduce all tone levels smoothly. For that purpose, the maximum threshold value (M1×M2−1) in each M1×M2 threshold matrix is replaced by any value selected at random among the values in a range of 0 to (M1×M2−2) as described before.

If Inequalities (7a) and (7b) given below are applied for the ON/OFF determination for each dot, the minimum threshold value (=0) is to be replaced by any value in the range of 0 to (M1×M2−2):

$$\text{Image data ID}\geq\text{Threshold data TD: ON (black)} \quad (7a)$$

$$\text{Image data ID<Threshold data TD: OFF (white)} \quad (7b)$$

B. Preparation of Threshold Matrices for Plural Color Components

In order to print a color image with printing plates, the halftone process is required for each of the plural color components of color image data to produce halftone images for the respective printing plates. There are several methods described below which are applicable to the halftone process of color image data.

The first method independently prepares L1×L2 threshold matrices for the respective color components of the color image data. Since threshold values are arranged at random in each threshold matrix as described previously, the L1×L2 threshold matrices thus prepared for the respective color components have different distributions of threshold values. This method effectively prevents moire and rosette patterns in the process of printing a color image with plural printing plates.

The second method uses only one L1×L2 threshold matrix, but assigns different offsets of the L1×L2 threshold matrix to the respective color components in the halftone process. FIGS. 15(a)–15(d) show the halftone process according to the second method. In this example, color image data consists of four color components of Y (yellow), M (magenta), C (cyan), and K (black). The respective color components have different offsets OY, OM, OC, and OK with respect to the origin O on the image plane. Each block defined by '256×256' corresponds to the same L1×L2 threshold matrix, which is repeatedly applied on the image plane. While the offset OY(Xy,Yy) of the component Y is set equal to (0,0), the offsets OM(Xm,Ym), OC(Xc,Yc), and OK(Xk,Yk) of the components M, C, and K are set to have different values. It is preferable that these offsets are equal to integral multiples of M1 or M2 for the M1×M2 threshold matrix, although other arbitrary integers are also applicable.

Assigning different offsets to the respective color components allows the respective color components to have different distributions of threshold values only with one L1×L2 threshold matrix stored in a memory. This method also effectively prevents the moire and rosette patterns in the process of printing a color image with plural printing plates. Since the second method uses only one L1×L2 threshold matrix stored in a memory, it reduces the time and labor required for preparation of threshold matrices and desirably saves the memory capacity.

Instead of storing only one L1×L2 threshold matrix and a plurality of offset addresses in the memory, another possible method stores a plurality of threshold matrices prepared in advance and shown as hatched blocks in FIGS. 15(a) through 15(d); these threshold matrices are written in a memory from one L1×L2 threshold matrix while shifting the write address of the L1×L2 threshold matrix according to the offset addresses of the respective color components. This alternative method does not save the memory capacity but reduces the time and labor required for preparation of a plurality of threshold matrices.

C. Structure and Operation of Apparatus

Figure 16:
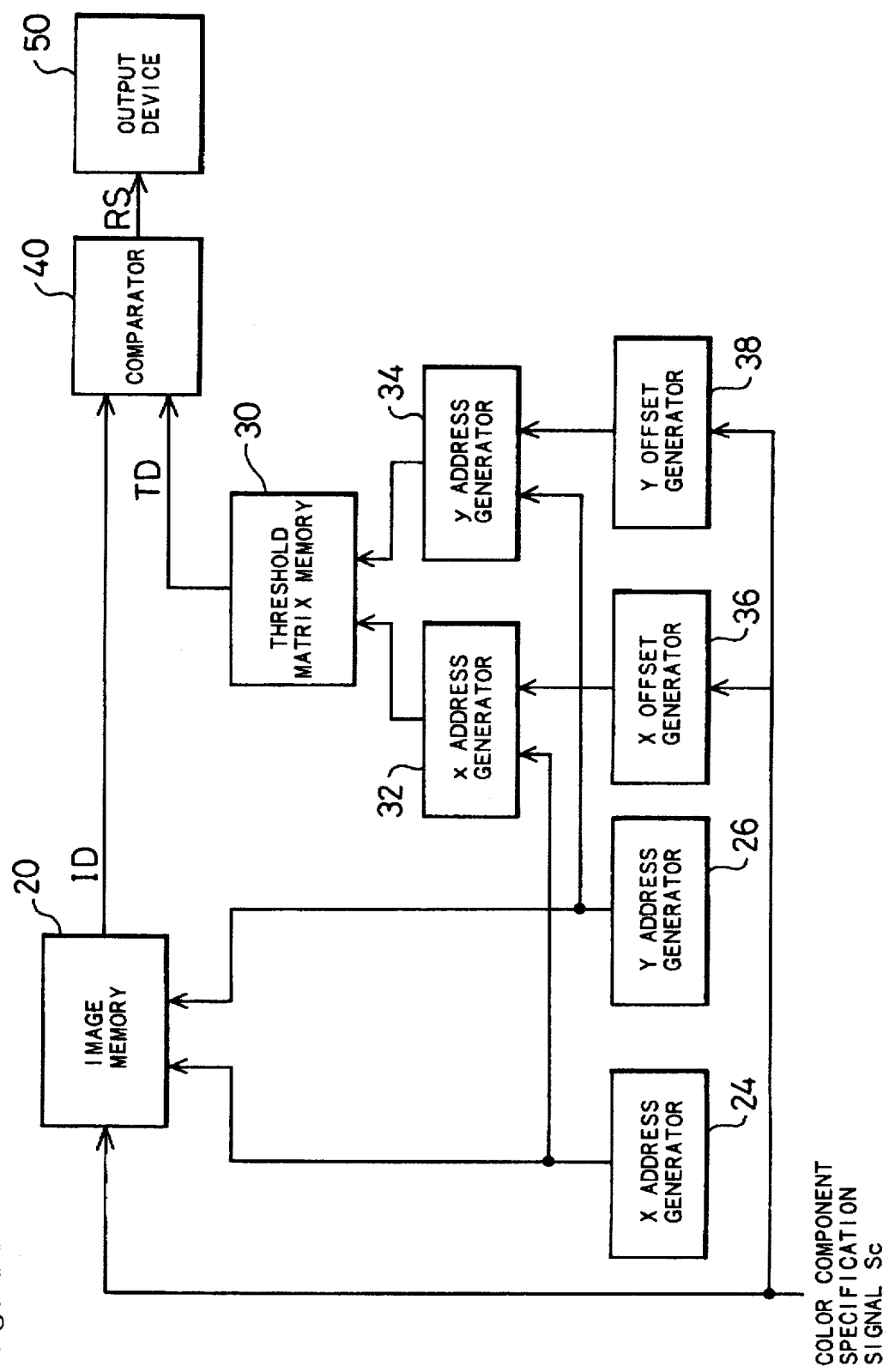
FIG. 16 is a block diagram illustrating the structure of an image recording apparatus embodying the present invention.

FIG. 16 is a block diagram illustrating the structure of an image recording apparatus embodying the present invention. The image recording apparatus comprises: an image memory 20 for storing multi-tone image data ID; address generators 24 and 26 for generating secondary scanning addresses (X addresses) and primary scanning addresses (Y addresses) on the image plane, respectively; a threshold matrix memory 30 for storing an L1×L2 threshold matrix; address generators 32 and 34 for generating secondary scanning addresses (x addresses) and primary scanning addresses (y addresses) in the L1×L2 threshold matrix, respectively; offset generators 36 and 38 for generating offsets of the L1×L2 threshold matrix in the secondary scanning direction (X offsets) and in the primary scanning direction (Y offsets), respectively; a comparator 40 for comparing image data with a threshold value; and an output device 50 for recording a halftone image on a recording medium. The image memory 20 and the offset generators 36 and 38 receive a color component identification signal Sc output from a controller (not shown), such as a CPU. The color component identification signal Sc indicates one of the plural color components.

A certain color component of the image data ID specified by the color component specification signal Sc are read out of the image memory 20 according to the X address and the Y address generated by the address generators 24 and 26. The offset generators 36 and 38 output offsets of the color component specified by the color component specification signal Sc. The second method, which assigns different offsets to the respective color components as shown in FIGS. 15(a)–15(d), is applied to the apparatus of FIG. 16. If the first method is applied, which stores threshold matrices prepared for the respective color components in the threshold matrix memory 30, the offset generators 36 and 38 can be omitted.

A secondary scanning coordinate x in the L1×L2 threshold matrix is generated by the x address generator 32 according to the X address output from the X address generator 24 (that is, the secondary scanning coordinate on the image plane) and the X offset output from the X offset generator 36. The x address is constituted by a predetermined number of effective bits of the value obtained by subtracting the X offset from the X address. The effective bits represent the dimension of the L1×L2 threshold matrix in the x direction. In the example of FIGS. 15(a)–15(d), the number of effective bits in the x direction is equal to 8. A primary scanning coordinate y in the L1×L2 threshold matrix is generated by the y address generator 34 in the same manner as above. In the example of FIGS. 15(a)–15(d), the number of effective bits in the y direction is also equal to 8.

The threshold values TD stored in the threshold matrix memory 30 are read out according to the addresses given from the address generators 32 and 34 and compared with the multi-tone image data ID by the comparator 40. The comparator 40 generates a record signal RS representing ON/OFF of each spot based on the result of comparison and supplies the record signal RS to the output device 50. The output device 50, such as a recording scanner, records halftone images of the respective color components on a recording medium, such as a photosensitive film. The halftone images of the respective color components thus prepared do not have prominent regular patterns, and a resulting color image prepared by superposing these halftone images one upon another does not have undesirable interference patterns, such as moire and rosette patterns.

The above embodiment is only illustrative and not restrictive in any sense. There may be many changes, modifications, and alterations without departing the scope or spirit of essential characteristics of the invention. Some examples of modification are given below.

(1) The method of dividing an M1×M2 threshold matrix region is not restricted to the process of steps S3 through S8 in the flowchart of FIG. 1, but another process may be applicable for the region division. For example, a threshold matrix region is first divided vertically into long divisional matrix regions of 2 dots in width of the secondary scanning direction, and each divisional matrix region is then divided horizontally into 2×2-dot divisional matrix regions.

In the above embodiment, however, the first division routine gives square-shaped divisional matrix regions whereas the second division routine further divides each square-shaped divisional matrix region into four equal parts, that is, smaller square-shaped divisional matrix regions. This allows different values of '0' to '3' of priority (different paired bits constituting a threshold value) to be assigned to the four smaller square-shaped divisional matrix regions. Therefore, this process desirably gives a threshold matrix in which closer values are not localized as illustrated in FIG. 13.

(2) In the above embodiment, the width M1 of the threshold matrix in the secondary scanning direction is an integer of an n-th power of 2, while the width M2 in the primary scanning direction is an integer obtained by multiplying M1 by an n-th power of 4. M1 and M2 may, however, be any arbitrary integers. In the latter case, in place of the process executed at step S2 and subsequent steps in the flowchart of FIG. 1, a different process is applied to determine threshold values. Even in such a case, setting a 50% dot pattern according to the process of step S1 effectively prevents the occurrence of undesirable local dot patterns as shown in FIGS. 2(A)–2(F).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of producing a threshold matrix used in a halftone process of multi-tone image data, said method comprising the steps of:

(a) providing a plurality of fundamental tiles each having a size of 2×2 dots in which two black dots and two white dots are arranged in parallel;

(b) arranging said plurality of fundamental tiles in a threshold matrix region while preventing said fundamental tiles to form a predetermined forbidden arrangement, thereby determining an array of black dots and white dots in a 50%-halftone image in said threshold matrix region, said 50%-halftone image having an area rate of 50% for both of black dots and white dots; and (c) determining threshold values in said threshold matrix region based on the arrangement of said plurality of fundamental tiles in said threshold matrix region, thereby producing said threshold matrix.

2. A method in accordance with claim 1, wherein
said predetermined forbidden arrangement comprises a first-type forbidden arrangement in which at least either of black dots and white dots are arrayed in a 2×2 square shape.

3. A method in accordance with claim 2, wherein
said predetermined forbidden arrangement comprises a second-type forbidden arrangement in which at least either of black dots and white dots are arrayed in a 4×1 linear shape.

4. A method in accordance with claim 3, wherein
said step (c) comprises the step of:
assigning values of 0 and 1 to an upper-most pair of bits of 2N-bit digital data representing threshold values at the positions of two black dots in each fundamental tile in said threshold matrix region, where N is an integer of at least 2, and assigning values of 2 and 3 to said upper-most pair of bits for threshold values at the positions of two white dots in each fundamental tile.

5. A method in accordance with claim 4, wherein
said threshold matrix region has a width of M1 dots in a first scanning direction and a width of M2 dots in a second scanning direction, where M1 is an integer of a power of 2 and M2 is an integer obtained by multiplying M1 by a power of 4; and
said step (c) further comprises the steps of:
(1) dividing said threshold matrix region along said second scanning direction into four equal parts to produce four pieces of first divisional regions, and assigning different 2-bit values representing first priorities of 0 through 3 to said first divisional regions, respectively;
(2) repeating said step (1) until a width of each of said first divisional regions in said second scanning direction becomes equal to the width M1 of said threshold matrix region, thereby producing a plurality of M1×M1 divisional regions;
(3) dividing each of said plurality of M1×M1 divisional regions into two equal parts both in said first scanning direction and said second scanning direction to produce four pieces of second divisional regions, and assigning different 2-bit values representing second priorities of 0 through 3 to said second divisional regions, respectively;
(4) repeating said step (3) until each of said second divisional regions has a width of 2 dots; and
(5) allocating the first and second priorities to (N−1) pairs of lower bits in said 2N-bit digital data representing threshold values, thereby determining threshold values in said threshold matrix region.

6. A method in accordance with claim 1, wherein
said predetermined forbidden arrangement comprises a second-type forbidden arrangement in which at least either of black dots and white dots are arrayed in a 4×1 linear shape.

7. A method in accordance with claim 6, wherein
said step (c) comprises the step of:
assigning values of 0 and 1 to an upper-most pair of bits of 2N-bit digital data representing threshold values at the positions of two black dots in each fundamental tile in said threshold matrix region, where N is an integer of at least 2, and assigning values of 2 and 3 to said upper-most pair of bits for threshold values at the positions of two white dots in each fundamental tile.

8. A method in accordance with claim 7, wherein
said threshold matrix region has a width of M1 dots in a first scanning direction and a width of M2 dots in a second scanning direction, where M1 is an integer of a power of 2 and M2 is an integer obtained by multiplying M1 by a power of 4; and
said step (c) further comprises the steps of:
(1) dividing said threshold matrix region along said second scanning direction into four equal parts to produce four pieces of first divisional regions, and assigning different 2-bit values representing first priorities of 0 through 3 to said first divisional regions, respectively;
(2) repeating said step (1) until a width of each of said first divisional regions in said second scanning direction becomes equal to the width M1 of said threshold matrix region, thereby producing a plurality of M1×M1 divisional regions;
(3) dividing each of said plurality of M1×M1 divisional regions into two equal parts both in said first scanning direction and said second scanning direction to produce four pieces of second divisional regions, and assigning different 2-bit values representing second priorities of 0 through 3 to said second divisional regions, respectively;
(4) repeating said step (3) until each of said second divisional regions has a width of 2 dots; and
(5) allocating the first and second priorities to (N−1) pairs of lower bits in said 2N-bit digital data representing threshold values, thereby determining threshold values in said threshold matrix region.

9. A method in accordance with claim 1, wherein
said step (c) comprises the step of:
assigning values of 0 and 1 to an upper-most pair of bits of 2N-bit digital data representing threshold values at the positions of two black dots in each fundamental tile in said threshold matrix region, where N is an integer of at least 2, and assigning values of 2 and 3 to said upper-most pair of bits for threshold values at the positions of two white dots in each fundamental tile.

10. A method in accordance with claim 9, wherein
said threshold matrix region has a width of M1 dots in a first scanning direction and a width of M2 dots in a second scanning direction, where M1 is an integer of a power of 2 and M2 is an integer obtained by multiplying M1 by a power of 4; and
said step (c) further comprises the steps of:
(1) dividing said threshold matrix region along said second scanning direction into four equal parts to produce four pieces of first divisional regions, and assigning different 2-bit values representing first priorities of 0 through 3 to said first divisional regions, respectively;
(2) repeating said step (1) until a width of each of said first divisional regions in said second scanning direction becomes equal to the width M1 of said threshold matrix region, thereby producing a plurality of M1×M1 divisional regions;
(3) dividing each of said plurality of M1×M1 divisional regions into two equal parts both in said first scanning direction and said second scanning direction to produce four pieces of second divisional regions, and assigning different 2-bit values representing second priorities of 0 through 3 to said second divisional regions, respectively;

(4) repeating said step (3) until each of said second divisional regions has a width of 2 dots; and (5) allocating the first and second priorities to (N−1) pairs of lower bits in said 2N-bit digital data representing threshold values, thereby determining threshold values in said threshold matrix region.

11. A method of generating a halftone image by comparing multi-tone image data with a threshold matrix, said method comprising the steps of:
   (a) providing a first memory for storing a threshold matrix, said threshold matrix being prepared by
      (i) providing a plurality of fundamental tiles each having a size of 2×2 dots in which two black dots and two white dots are arranged in parallel;
      (ii) arranging said plurality of fundamental tiles in a threshold matrix region while preventing said fundamental tiles to form a predetermined forbidden arrangement, thereby determining an array of black dots and white dots in a 50%-halftone image in said threshold matrix region, said 50%-halftone image having an area rate of 50% for both of black dots and white dots; and
      (iii) determining threshold values in said threshold matrix region based on the arrangement of said plurality of fundamental tiles in said threshold matrix region, thereby producing said threshold matrix;
   (b) comparing multi-tone image data with a threshold value read out of said first memory, thereby converting said multi-tone image data to a recording signal representing a halftone image; and
   (c) producing said halftone image in response to said recording signal.

12. A method in accordance with claim 11, wherein said predetermined forbidden arrangement comprises a first-type forbidden arrangement in which at least either of black dots and white dots are arrayed in a 2×2 square shape.

13. A method in accordance with claim 12, wherein said predetermined forbidden arrangement comprises a second-type forbidden arrangement in which at least either of black dots and white dots are arrayed in a 4×1 linear shape.

14. A method in accordance with claim 13, wherein said step (iii) comprises the step of:
   assigning values of 0 and 1 to an upper-most pair of bits of 2N-bit digital data representing threshold values at the positions of two black dots in each fundamental tile in said threshold matrix region, where N is an integer of at least 2, and assigning values of 2 and 3 to said upper-most pair of bits for threshold values at the positions of two white dots in each fundamental tile.

15. A method in accordance with claim 14, wherein said threshold matrix region has a width of M1 dots in a first scanning direction and a width of M2 dots in a second scanning direction, where M1 is an integer of a power of 2 and M2 is an integer obtained by multiplying M1 by a power of 4; and said step (iii) further comprises the steps of:
   (1) dividing said threshold matrix region along said second scanning direction into four equal parts to produce four pieces of first divisional regions, and assigning different 2-bit values representing first priorities of 0 through 3 to said first divisional regions, respectively;
   (2) repeating said step (1) until a width of each of said first divisional regions in said second scanning direction becomes equal to the width M1 of said threshold matrix region, thereby producing a plurality of M1×M1 divisional regions;
   (3) dividing each of said plurality of M1×M1 divisional regions into two equal parts both in said first scanning direction and said second scanning direction to produce four pieces of second divisional regions, and assigning different 2-bit values representing second priorities of 0 through 3 to said second divisional regions, respectively;
   (4) repeating said step (3) until each of said second divisional regions has a width of 2 dots; and
   (5) allocating the first and second priorities to (N−1) pairs of lower bits in said 2N-bit digital data representing threshold values, thereby determining threshold values in said threshold matrix region.

16. An apparatus for generating a halftone image by comparing multi-tone image data with a threshold matrix, said apparatus comprising:
   a memory for storing a threshold matrix, said threshold matrix being prepared by
      (i) providing a plurality of fundamental tiles each having a size of 2×2 dots in which two black dots and two white dots are arranged in parallel;
      (ii) arranging said plurality of fundamental tiles in a threshold matrix region while preventing said fundamental tiles to form a predetermined forbidden arrangement, thereby determining an array of black dots and white dots in a 50%-halftone image in said threshold matrix region, said 50%-halftone image having an area rate of 50% for both of black dots and white dots; and
      (iii) determining threshold values in said threshold matrix region based on the arrangement of said plurality of fundamental tiles in said threshold matrix region, thereby producing said threshold matrix;
   means for reading out a threshold value from said memory; and
   a comparator for comparing multi-tone image data with the threshold value read out of said memory, thereby converting said multi-tone image data to a recording signal representing a halftone image; and
   recording means for producing said halftone image in response to said recording signal.

17. An apparatus in accordance with claim 16, wherein said predetermined forbidden arrangement comprises a first-type forbidden arrangement in which at least either of black dots and white dots are arrayed in a 2×2 square shape.

18. An apparatus in accordance with claim 17, wherein said predetermined forbidden arrangement comprises a second-type forbidden arrangement in which at least either of black dots and white dots are arrayed in a 4×1 linear shape.

19. An apparatus in accordance with claim 18, wherein said step (iii) comprises the step of:
   assigning values of 0 and 1 to an upper-most pair of bits of 2N-bit digital data representing threshold values at the positions of two black dots in each fundamental tile in said threshold matrix region, where N is an integer of at least 2, and assigning values of 2 and 3 to said upper-most pair of bits for threshold values at the positions of two white dots in each fundamental tile.

20. An apparatus in accordance with claim 19, wherein said threshold matrix region has a width of M1 dots in a first scanning direction and a width of M2 dots in a second scanning direction, where M1 is an integer of a power of 2 and M2 is an integer obtained by multiplying M1 by a power of 4; and said step (iii) further comprises the steps of:

(1) dividing said threshold matrix region along said second scanning direction into four equal parts to produce four pieces of first divisional regions, and assigning different 2-bit values representing first priorities of 0 through 3 to said first divisional regions, respectively;

(2) repeating said step (1) until a width of each of said first divisional regions in said second scanning direction becomes equal to the width M1 of said threshold matrix region, thereby producing a plurality of M1×M1 divisional regions;

(3) dividing each of said plurality of M1×M1 divisional regions into two equal parts both in said first scanning direction and said second scanning direction to produce four pieces of second divisional regions, and assigning different 2-bit values representing second priorities of 0 through 3 to said second divisional regions, respectively;

(4) repeating said step (3) until each of said second divisional regions has a width of 2 dots; and (5) allocating the first and second priorities to (N−1) pairs of lower bits in said 2N-bit digital data representing threshold values, thereby determining threshold values in said threshold matrix region.

* * * * *